United States Patent [19]
Aizawa et al.

[11] 3,812,510
[45] May 21, 1974

[54] ELECTRIC CONTROL DEVICE FOR A CAMERA

[75] Inventors: Hiroshi Aizawa, Tokyo; Mitsutoshi Ogiso, Kawasaki, both of Japan

[73] Assignee: Canon Kabushiki Kaisha, Tokyo, Japan

[22] Filed: Dec. 29, 1972

[21] Appl. No.: 319,743

[30] Foreign Application Priority Data
Dec. 30, 1971  Japan................................. 47-1089

[52] U.S. Cl................. 354/235, 95/57, 95/10 CT
[51] Int. Cl............................ G03b 7/00, G03b 9/28
[58] Field of Search............ 95/53 E, 53 EA, 31 EL, 95/5 T, 10 C, 10 CT

[56] References Cited
UNITED STATES PATENTS

| | | | |
|---|---|---|---|
| 2,949,834 | 8/1960 | Doyle et al. | 95/57 |
| 3,135,181 | 6/1964 | Gevatter | 95/53 E |
| 3,656,420 | 4/1972 | Aizawa et al. | 95/53 E |

*Primary Examiner*—Robert P. Greiner
*Attorney, Agent, or Firm*—Toren, McGeady & Stanger

[57] ABSTRACT

An automatic shutter control system for a camera includes a continuous rotatable motor coupled to a pair of separately engageable electromagnetic clutches. The clutches are respectively operable, when engaged, for releasing the shutter to commence exposure and for winding up the shutter after exposure has terminated. When camera operation is initiated, the first clutch is engaged to release the shutter and to trigger the start of a manually selectable exposure duration. At the conclusion of the selected duration, the first clutch is disengaged and the second clutch is engaged to begin the wind-up of the shutter. An inertial sensor on the motor terminates the wind-up operation and disengages the second clutch when the increased torque on the motor from wind-up reaches a predetermined value. Where continuous operation of the camera is desired, the completion of wind-up triggers an interval control circuit which effects the re-engagement of the first clutch after a prescribed time delay to initiate another cycle of operation. Facilities are provided for overriding the manually set exposure duration whenever the required film exposure time exceeds such set duration to automatically delay the completion of the shutter release operation until the completion of the exposure.

9 Claims, 15 Drawing Figures

ELECTRIC CONTROL DEVICE FOR A CAMERA

The present invention relates to an electric control device for a camera, particularly to an electric control device for a camera suitable for a motor drive system.

Heretofore an electric control device employing a motor drive system is to stop a driving motor at the time shutter wind up is completed, therefore time is required for the starting of the motor for the next photographing thus high speed continuous photographing cannot be done. And as a motor drive system to continuously actuate a camera, there is known a drive clock system to conduct photographing holding the photographing cycle from shutter release starting till starting of next shutter release at a predetermined length of time, and a shutter clock system to vary the above mentioned photographing cycle corresponding to exposure time. Therefore, when shutter speed of a camera is manually pre-set, the exposure time becomes uniform, thus it inevitably becomes a drive clock, while in an EE camera in which shutter speed is automatically determined especially in an EE camera in which diaphragm is given preference, exposure time changes in each photographing thus it becomes a shutter clock. However, even in EE photographing, when such objects changing every second are photographed as in sports photographing, a drive clock is effective, and on the other hand when such objects as having their brightness sharply changed, a shutter clock is effective. Because of this in EE photographing by a motor drive such camera has been desired as having both drive clock and shutter clock.

The first object of the present invention is to provide an electric control device for a camera in which the shutter release wind up is repeated while rotation of motor is continued at the time of continuous photographing to that high speed continuous photographing can be done easier than before.

The second object of the present invention is to provide an electric control device of a camera in which photographing cycle is easily controlled by an external trigger terminal utilizing for example light, sound, electric wave, etc.

The third object of the present invention is to provide an electric control device for a camera in which wide range of shutter speed can be used depending on exposure conditions.

The fourth object of the present invention is to provide an electric control device for a camera in which four different modes of use can be made as one frame photographing and continuous photographing each by hand holding and by remote.

The fifth object of the present invention is to provide an electric control device for a camera having both a drive clock system and a shutter clock system.

The sixth object of the present invention is to provide an electric control device for a camera having a means to indicate whether a drive clock system or a shutter clock system is in use at the time of photographing.

The seventh object of the present invention is to provide an electric control device for a camera in which range of use of a drive clock is enlarged by providing a plural number of shutter timers.

The eighth object of the present invention is to provide an electric control device for a camera having a means to indicate the shutter timer which is in action corresponding to each shutter speed when plural number of shutter timers are provided.

The ninth object of the present invention is to provide an electric control device for a camera in which a number of semi-conductors are used in the electric control circuit to hold the number of mechanical switches to the minimum required for enhancing reliability.

BRIEF EXPLANATION OF DRAWINGS

Now an example of the present invention shall be explained referring to the drawings. FIG. 1 is to show an outline of the device by a block diagram, wherein E is a power source, $S_1$ is a switch for placing the power source E in association with the first step action of a release button not shown in the drawing, and a power source self retention circuit 1 becomes ON as said switch $S_1$ becomes ON, and at the same time a motor M rotates. $S_2$ is a switch which is linked with the second step action of a release button not shown in the drawing. As this switch $S_2$ becomes ON, a second thyristor $SCR_2$ becomes ON, also placing a first electromagnetic clutch coil $CL_1$ in ON state, thereby a lock mechanism 2 is actuated by the motor M, locking the release member 3 and starting shutter releasing. Said second thyristor $SCR_2$ is made OFF by said lock signal to make the first electro-magnetic clutch coil $CL_1$ OFF, and at the same time the photographing time control circuit 4 is actuated placing an electro-magnet P in ON state after a lapse of $T_1$ second, and the lock of the release member 3 by the above lock mechanism 2 is released to complete the release. The first thyristor $SCR_1$ is made ON by this lock release signal to place the second electro-magnetic clutch coil $CL_2$ in ON state, thereby a wind up coupler 5 is actuated by the motor M to conduct wind up of shutter. Y-shape fork lever 6 is actuated by completion of shutter wind up to place the switch $S_4$ in OFF state momentarily, placing the above mentioned second electromagnetic clutch coil $CL_2$ in OFF state, and at the same time a photographing time control circuit 7 is actuated, placing the above mentioned second thyristor $SCR_2$ in ON state after a lapse of $T_2$ seconds, thereafter same process as above is repeated to perform continuous photographing action. When the above mentioned power source E self retention circuit 1 is placed in OFF state by a momentary OFF action of the switch $S_4$, one frame photographing can be made. $S_6$ is a switch to make change over between the photographing time control circuit 4 and an external signal supplied from the terminal Sig. 1. $S_7$ is a switch to make change over between the photographing interval time control circuit 7 and an external signal supplied from the terminal Sig. 2.

Figure 1:
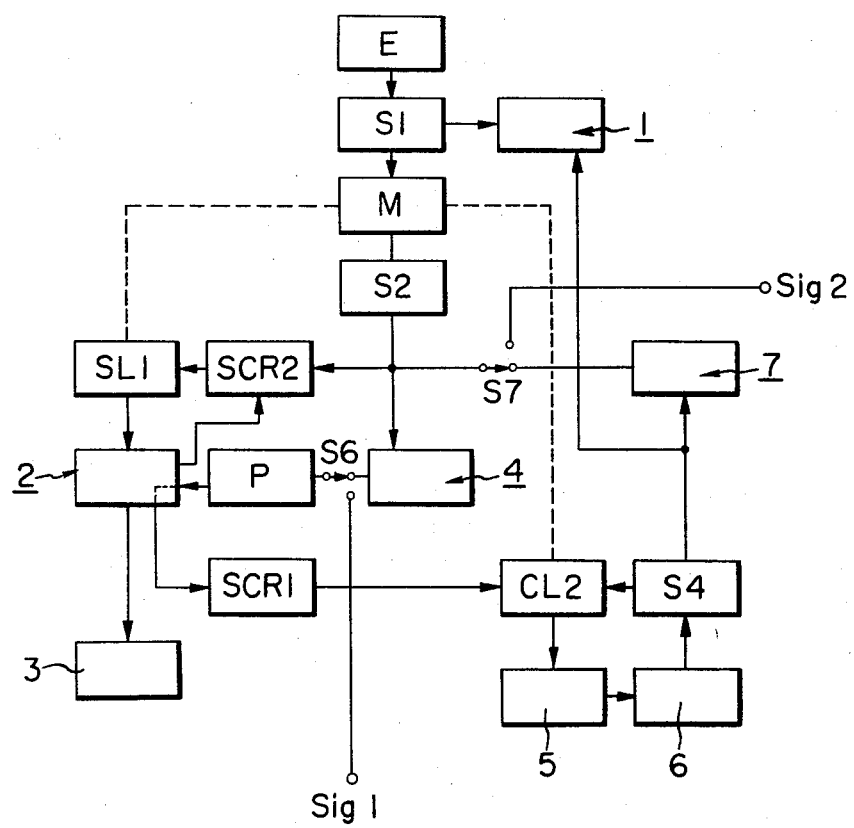
FIG. 1 is a block arrangement diagram showing an example of the present invention.
Figure 2:
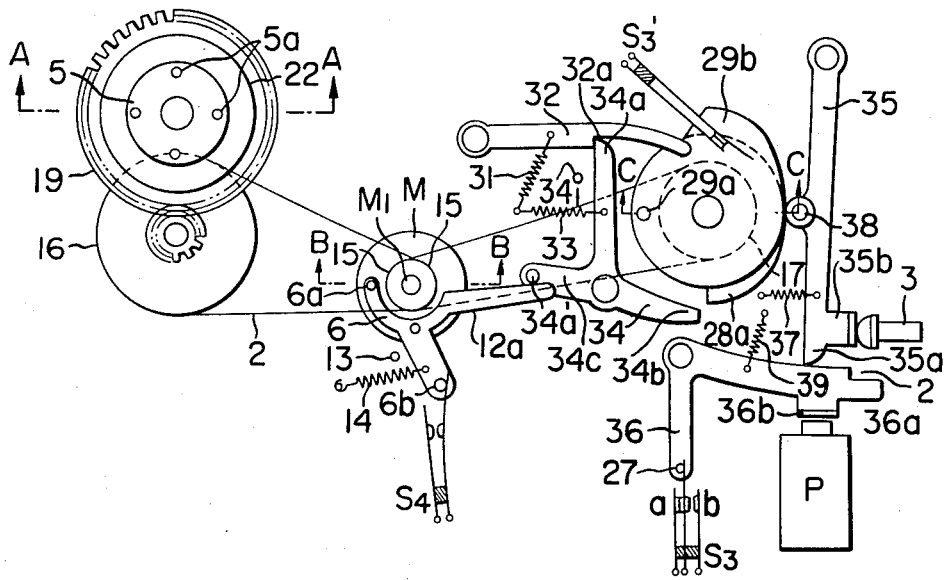
FIG. 2 shows an arrangement of a driving mechanism of the camera in FIG. 1.
Figure 3:
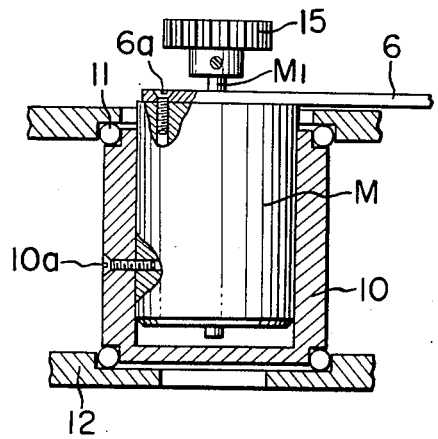
FIG. 3 is a cross sectional view to show the way the motor in FIG. 2 is supported.
Figure 4:
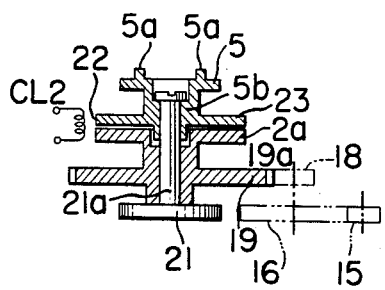
FIG. 4 is a cross sectional view to show a shutter wind up coupler of FIG. 2.
Figure 5:
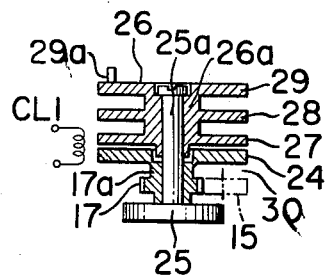
FIG. 5 is a cross sectional view to show a rotation member for shutter release control of FIG. 2.

Now concrete explanations shall be made on FIG. 1, and first the driving mechanism of a camera shall be explained by FIG. 2. M, 2, P, 3, 5, 6, $S_4$ are a motor, a lock mechanism, a release member, an electro-magnet, a wind up coupler, Y-shape fork lever, a switch, respectively shown in FIG. 1. The motor M is fixed to a holder 10 by screw 10a as shown in FIG. 3, and the holder 10 is rotatably attached to a case 12 by bearing 11. A Y-shape forked lever 6 which is biassed in a clockwise direction by a spring 14 to the position of a stopper 13 always is attached to a stator of said motor M by a screw 6a. This motor M is so made as being rotated integrally with the Y-shape forked lever 6 against the spring 14 when the reaction of the motor M is momentarily increased. A pin 6b is provided at one end of the Y-shape forked lever 6 and a movable contact of the switch $S_4$ of constantly closed type is made to engage with said pin 6b, and when the Y-shape forked lever 6 is rotated in a counter-clockwise direction, the movable contact leaves a fixed contact placing the switch $S_4$ in OFF state. A first gear 15 is attached to a rotating axle $M_1$ of said motor M, and second and third gears 16, 17 are engaged with the first gear, but in FIG. 1 for convenience of explanation they are linked together with belts x and y. A fifth gear 19 engages as shown in FIG. 4, as a last wind up gear, with a fourth gear 18 being installed coaxially with said second gear 16. An electro-magnetic clutch plate 20 is installed coaxially 19a with said fifth gear 19, and an extension axle 21a of a disk 21 installed to the case 12 is inserted inside the axle 19a, and the axle 19a is made rotatable against the extension axle 21a. An electro-magnetic clutch plate 22 provided at one end of a wind up coupler 5 is positioned at a position corresponding to the electro-magnetic clutch plate 20, and a projected part 5a provided at the other end plane of the wind up coupler 5 engages with an engaging member of a camera not being shown in the drawing. A forward end of the extension axle 21a of the disk 21 is inserted into an axle 5 b of a wind up coupler 5, and said forward end of the extension axle 21a is made rotatable against the wind-up coupler 5. And electro-magnetic clutch plates 20 and 22 forming second electro-magnetic clutch 23 are so opposed to each other as being separated by a predetermined distance. The second electro-magnetic clutch coil $CL_2$ is placed adjacent to said electro-magnetic clutch 23, wherein the electromagnetic clutch plates 20, 22 are coupled together when said second electromagnetic clutch coil $CL_2$ is conducted through. And an electro-magnetic clutch plate 24 is attached to the third gear 17 to their co-axle 17a, and an extension axle 25a of a disk 25 installed to the case 12 is inserted inside the axle 17a, wherein the axle 17a is rotatable against the extension axle 25a. An electro-magnetic clutch plate 27 of a release control rotating member 26 is placed against the electro-magnetic clutch plate 24. This rotating member 26 consists of an electro-magnetic clutch plate 27 and a stop cam 28 having an engaging part 28a, and a release cam 29 having a riser part 29a being placed co-axially 26a. And a forward end of the extension axle 25a of the disk 25 is inserted in the axle 26a of the rotating member 26, and is rotatable against the extension axle 25a. The electro-magnetic clutch plates 24 and 27 forming the first electro-magnetic clutch 30 are so opposed against each other as being separated by a predetermined distance. A first electro-magnetic clutch coil $CL_1$ is placed being adjacent to said electro-magnetic clutch 30, wherein when the first electro-magnetic clutch coil $CL_1$ is conducted through, the electro-magnetic clutches 24 and 27 are coupled together. And a forward end of a lever 32 which is biassed by a spring 31 in a clockwise direction and has a stepped part 32a at its center is placed on a release cam 29. This lever 32 is rotated in a counter-clockwise direction by being pushed with a pin 29b provided on the release cam 29, and an end part 34a of T-shape lever 34 being biassed in a counter-clockwise direction by a spring 33 engages with the stepped part 32a of said lever 32. This T-shape lever 34 is so made as having its engagement with the stepped part 32a released by the rotation of the lever 32 in a counter-clockwise direction, and being rotated in a counter-clockwise direction to the position of the stopper $34_1$. When this T-shape lever 34 is rotated in a counter-clockwise direction its end part 34b engages with the engaging part 28a of the stopper cam 28. And a pin 34d is provided at an end part 34c of the T-shape lever 34, wherein the T-shape lever 34 is rotated in a clockwise direction by pushing the pin 34d with the rotation of the above mentioned lever 32, and the end part 34a of the T-shape lever 34 is made to engage with the stepped part 32a of the lever 32. 2 is a lock mechanism composed of a release lever 35 and an engaging lever 36, and the release lever 35 is biassed in a clockwise direction by a spring 37 with its one end serving as an axial support part, and a roller 38 provided at a center of the lever 35 is made to contact with the release cam 29 by the biassing power of the spring 37. The other end 35a of said release lever 35 is so made as engaged with a stepped part 36a provided at one end of an engaging lever 36 in L-shape having a bent part used as an axial support part. This engaging lever 36 is biassed in a counter-clockwise direction by a spring 39, and an electro-magnet P is provided near one end of the engaging lever 36, wherein when the magnet P is in action a steel plate part 36b at one end of the engaging lever 36 is attracted by the electro-magnet P, releasing the lock between the other end 35a of the release lever 35 of the lock mechanism 2 and the stepped part 36a of the engaging lever 36, to rotate the release lever 35 in a clockwise direction. A movable contact of the switch $S_3$ is engaged at the other end of the engaging lever 36, and the movable contact of the switch $S_3$ is changed over to b side of the fixed contact when the engaging lever 36 and the release lever 35 are locked, on the other hand when the lock between the engaging lever 36 and the release lever 35 is released the movable contact of the switch $S_3$ is changed over to a of the fixed contact. And a movable contact of a switch $S_3'$ of constantly closed type is provided on the release cam 29 behind said lever 32, wherein when this movable contact is pushed by the pin 29a, the movable contact of the switch $S_3'$ is separated from the fixed contact to place the switch $S_3'$ in OFF state. And a release member 39 which is linked with the release lever 35 is provided at the projection part 35b at the other end of the release lever 35.

Figure 6:
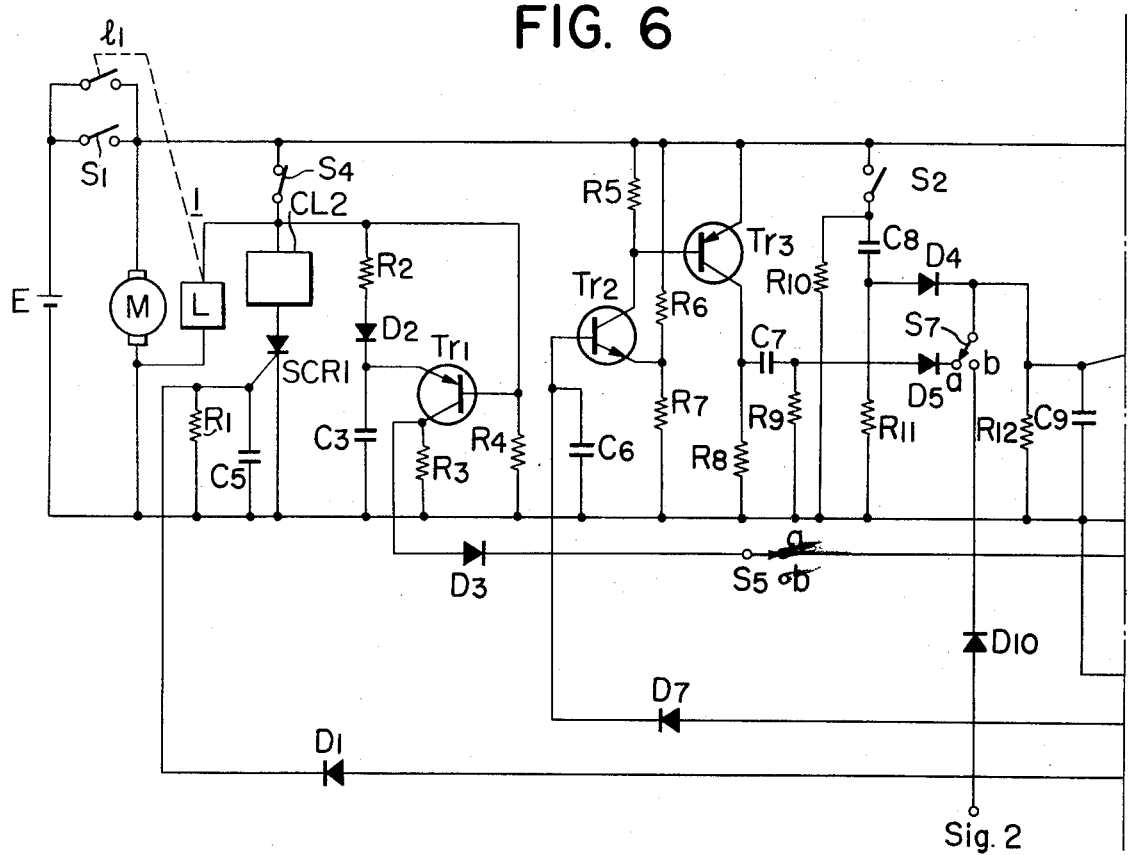
FIG. 6 is a circuit diagram to show an electric control circuit of the camera in FIG. 1.
Figure 6:
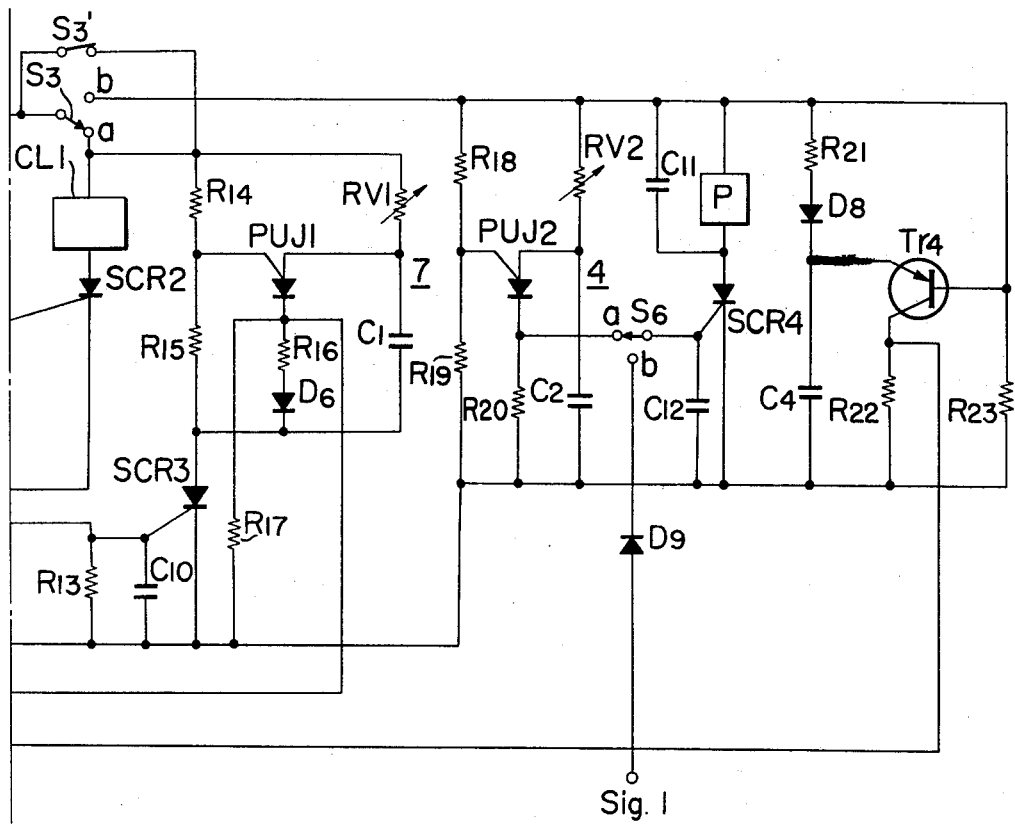

Next, explanations shall be made on the electric control circuit for a camera shown in FIG. 1 by referring to FIG. 6, wherein the same parts as in FIG. 1 and FIG. 2 will be identified by the same reference numbers or marks. F is a direct current power source, and to both ends of the power source E, a relay contact $l_1$ is connected in parallel while a power source switching in switch $S_1$ which is linked with the first step action of a release button which is not shown in the drawing and the motor M are connected in series. The switch $S_4$ of ordinarily closed type, the second electro-magnetic clutch coil $CL_2$, and the first thyrister $SCR_1$ in an ordinary direction are connected in series between the connecting point (hereinafter called point A at positive potential side) between the switch $S_1$ and the motor M, and the negative potential side of the power source E. This second electro-magnetic clutch coil $CL_2$ is placed in conductive state when the first thyrister $SCR_1$ becomes ON. The gate of the first thyrister $SCR_1$ is connected to the negative potential side of the power source E through the resistor $R_1$ to which a capacitor $C_5$ is connected in parallel. The connecting point between the switch $S_4$ and the second electro-magnetic clutch coil $CL_2$ is connected to the negative potential side of the power source E through the resistor $R_2$, a diode $D_2$ in an ordinary direction, and a capacitor $C_3$ in series. The connecting point between the switch $S_4$ and the second electro-magnetic clutch coil $CL_2$ is connected to the base of the first transistor $Tr_1$. The base of said first transistor $Tr_1$ is connected to the negative potential side of the power source E through the resistor $R_4$, and the collector is connected to the negative potential side of the power source E through the resistor $R_3$, while the emitter is connected to the above mentioned diode $D_2$ and the capacitor $C_3$. This first transistor $Tr_1$ is placed in ON state by electric charge of the capacitor $C_3$ when the switch $S_4$ becomes OFF. A power source self-retention circuit ( ⊥ ), comprising the above mentioned relay contact $l_1$, the switch $S_4$, the relay L being connected in series, is connected to the both ends of the power source E. And the point A at positive potential side is connected to the negative potential side of the power source E through the switch $S_2$, which are linked with the second step action of the release button with the capacitor $C_8$, the resistor $R_{11}$ being connected in series. The connecting point of said switch $S_2$ and the capacitor $C_8$ is connected to the negative potential side of the power source E through the resistor $R_{10}$. Also the point A at the positive potential side is connected to the movable contact of the switch $S_3$, and the fixed contact $a$ of the switch $S_3$ is connected to the negative potential side of the power source E through the first electro-magnetic clutch $CL_1$, the second thyrister $SCR_2$ in ordinary direction in series. This first electro-magnetic clutch $CL_1$ is placed in conductive state when the second thyrister $SCR_2$ becomes ON. The gate of said second thyrister $SCR_2$ is connected to the negative potential side of the power source E through the resistor $R_{12}$ to which a capacitor $C_9$ is connected in parallel. The connecting point between the capacitor $C_8$ and the resistor $R_{11}$ is connected to the gate of the second thyrister $SCR_2$ through the diode $D_4$ in ordinary direction. The point A at positive potential side is connected to the negative potential side of the power source E through the resistor $R_6$ and the resistor $R_7$ in series, and the connecting point between said resistor $R_6$ and the resistor $R_7$ is connected to the emitter of the second transistor $Tr_2$. The base of the second transistor $Tr_2$ is connected to the negative potential side of the power source E through the capacitor $C_6$, and its collector is connected to the point A at the positive potential side through the resistor $R_5$, further the collector is connected to the base of the third transistor $Tr_3$. The emitter of said third transistor $Tr_3$ is connected to the point A at the positive potential side, and its collector is connected to the negative potential side of the power source E through the resistor $R_8$, further the collector is connected to a fixed contact $a$ of the switch $S_7$ through the capacitor $C_7$, and the diode $D_5$ in ordinary direction in series. Said third transistor $Tr_3$ is placed in ON state as the second transistor $Tr_2$ is placed in ON state. The connecting point of the capacitor $C_7$ and the diode $D_5$ is connected to the negative potential side of the power source E through the resistor $R_9$. The fixed contact $b$ of said switch $S_7$ is connected to the external signal input terminal Sig. 2, while the movable contact of the switch $S_7$ is connected to the gate of the above mentioned second thyrister $SCR_2$. Said second thyrister $SCR_2$ will be placed in ON state when the plus pulse at the time when the third transistor $Tr_3$ is placed in ON state or the external signal from the terminal Sig. 2, by selection with the switch $S_7$, is supplied. The point A at the positive potential side is connected to the negative potential side of the power source E through the switch $S_3'$, the resistor $R_{14}$, the resistor $R_{15}$, and the third thyrister $SCR_3$ in an ordinary direction in series. The connecting point between the switch $S_3'$ and the resistor $R_{14}$ is connected to the connecting point between the fixed contact $a$ of said switch $S_3$ and the first electro-magnetic clutch coil $CL_1$, while the connecting point between the switch $S_3'$ and the resistor $R_{14}$ is connected to the anode of the above mentioned third thyrister $SCR_3$ through the first variable resistor $RV_1$ and the capacitor $C_1$ in series. The connecting point between the above mentioned first variable resistor $RV_1$ and the first capacitor $C_1$ is connected to the anode of a first programable unijunction (hereinafter called PUJ), wherein the gate of this $PUJ_1$ is connected to the connecting point between the above mentioned resistor $R_{14}$ and the resistor $R_{15}$, and the cathode of the $PUJ_1$ is connected to the anode of the above mentioned third thyrister $SCR_3$ through the resistor $R_{16}$ and the diode $D_6$ in ordinary direction in series. The cathode of the $PUJ_1$ is connected to the negative potential side of the power source E through the resistor $R_{17}$, further the cathode is connected to the base of the above mentioned second transistor $Tr_2$ through the diode $D_7$ in ordinary direction. This $PUJ_1$ is placed in ON state after lapse of such length of time as determined by the first variable resistor $RV_1$ and the capacitor $C_1$, placing the second transistor $Tr_2$ in ON state. The photographing interval time control circuit 2 comprises the resistor $R_{14}$, the resistor $R_{15}$, the first variable resistor $RV_1$, the capacitor $C_1$, and the $PUJ_1$. And the gate of the third thyrister $SCR_3$ is connected to the negative potential side through the resistor $R_{13}$ to which the capacitor $C_{10}$ is connected in parallel. The gate of the third thyrister $SCR_3$ is connected to the fixed contact $a$ of the switch $S_5$ having the fixed contacts $a$ and $b$, and the collector of the above mentioned first transistor $Tr_1$ is connected to the movable contact of said switch $S_5$ through the diode $D_3$ in ordinary direction. This third thyrister SCR$_3$ is placed in ON state when the first transistor T$r_1$ becomes ON. And the fixed contact b of the above mentioned switch S$_3$ is connected to the negative potential side of the power source E through the resistor R$_{18}$, and the resistor R$_{19}$ in series. The fixed contact b of the switch S$_3$ is connected to the negative potential side of the power source E through the second variable resistor RV$_2$ and the capacitor C$_2$ in series. The connecting point between the second variable resistor RV$_2$ and the capacitor C$_2$ is connected to the anode of the second programable uni-junction (hereinafter called PUJ). The gate of this PUJ$_2$ is connected to the connecting point between the above mentioned resistor R$_{18}$ and the resistor R$_{19}$. The cathode of this PUJ$_2$ is connected to the negative potential side of the power source E through the resistor R$_{20}$, and the cathode of PUJ$_2$ is connected to the fixed contact a of the switch S$_6$. The PUJ$_2$ will be placed in ON state after a lapse of such length of time as determined by the second variable resistor RV$_2$ and the capacitor C$_2$. The photographing time control circuit 4 comprises the resistor R$_{18}$, the resistor R$_{16}$, the second variable resistor RV$_2$, the capacitor C$_2$, and the PUJ$_2$. The external signal input terminal Sig. 1 is connected to the fixed contact b of the switch S$_6$ through the diode 9 in ordinary direction. The movable contact of said switch S$_6$ is connected to the gate of the fourth thyrister SCR$_4$. The gate of the fourth thyrister SCR$_4$ is connected to the negative potential side of the power source E through the capacitor C$_{12}$, and its cathode is connected to the negative potential side of the power source E, while its anode is connected to the fixed contact b of the above mentioned switch S$_3$ through the electro-magnet P to which the capacitor 11 is connected in parallel. Said fourth thyrister is placed in ON state when either the plus pulse as PUJ$_2$ becomes ON or the external signal from the terminal Sig. 1 is supplied to the gate by selection with the switch S$_6$. The electro-magnet P becomes ON when the fourth thyrister is placed in ON state. And the fixed contact b of the switch S$_3$ is connected to the negative potential side of the power source E through the resistor R$_{21}$, the diode D$_8$, and the capacitor C$_4$ in series. The connecting point between said diode D$_8$ and the capacitor C$_4$ is connected to the emitter of the fourth transistor T$r_4$, and the base of said fourth transistor is connected to the fixed contact of the switch S$_3$ while its base is connected to the negative potential side of the power source E through the resistor R$_{23}$. The collector of said fourth transistor T$r_4$ is connected to the negative potential side of the power source E through the resistor R$_{22}$, and the collector is connected to the gate of the above mentioned first thyrister SCR$_1$ through the diode D$_1$. This fourth transistor T$r_4$ is placed in ON state by the electric charge of the capacitor C$_4$ when the movable contact of the switch S$_3$ is changed over from the fixed contact a to the fixed contact b, wherein the first thyrister SCR$_1$ is placed in ON state when the fourth transistor TR$_4$ becomes ON.

Figure 7A:
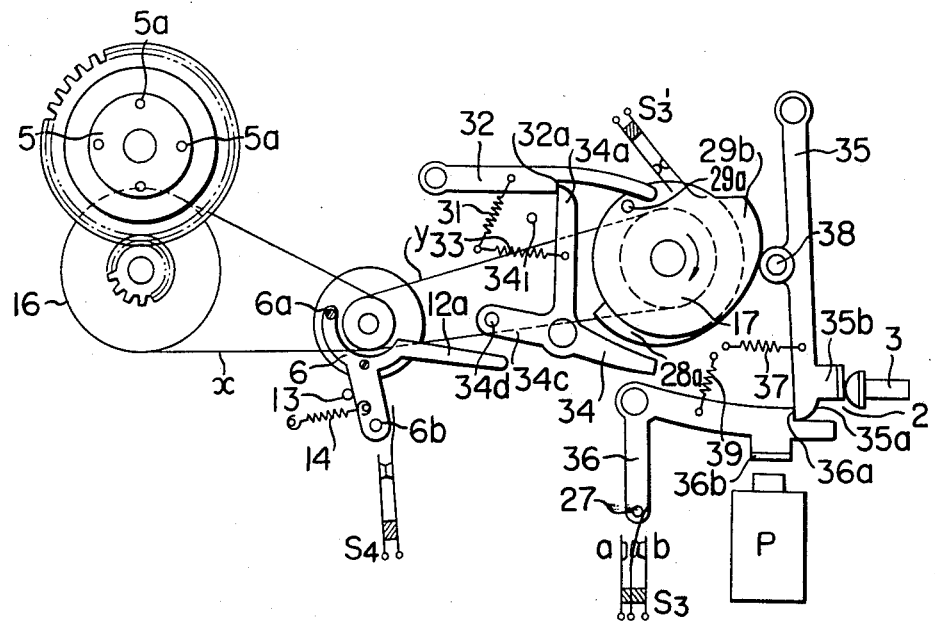
FIG. 7a, b, c, d are circuit diagrams to show functional states of FIG. 2.
Figure 7B:
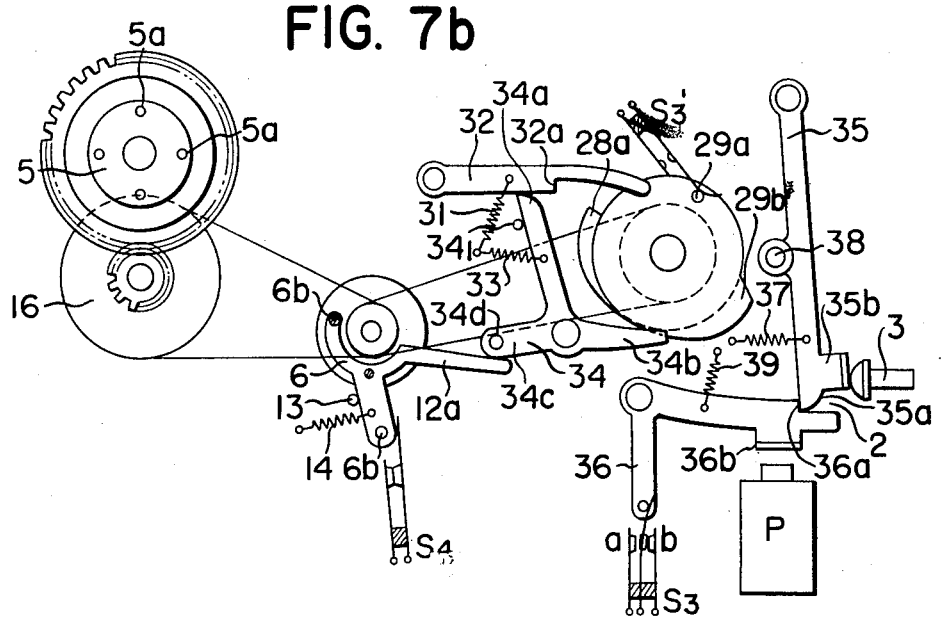
Figure 7C:
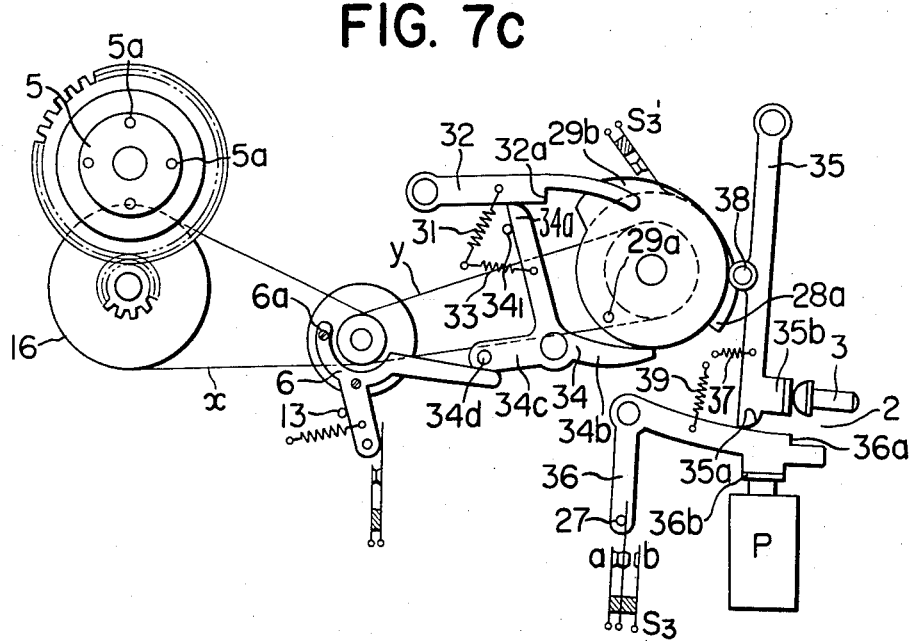
Figure 7D:
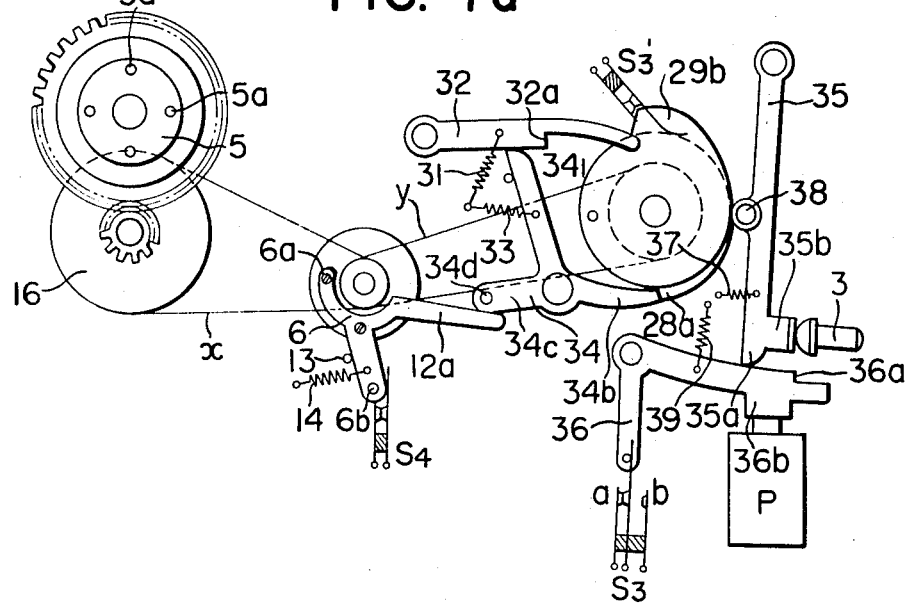

Next the function of the above mentioned set-up shall be explained starting with the explanation of the case for continuous photographing. The movable contacts of the switches S$_5$, S$_6$, S$_7$ are changed over to the fixed contact a side, and the driving mechanism of a camera is at first almost in a state shown in FIG. 2, wherein the movable contact of the switch S$_3$ has been changed over to the fixed contact a side, and the switch S$_3$' is in ON state, and the switch S$_4$ becomes ON. First, when the switch S$_1$ becomes ON by the first step action of a release button which is not shown in the drawing, the motor M starts rotating and at the same time, the power source self-retention circuit 1 functions, that is the relay L becomes conductive placing the relay contact l$_1$ in ON state, and self-retaining the power source E. And as the switch S$_2$ becomes ON by the second step action of the release button, the plus pulse is given to the gate of the second thyrister SCR$_2$ through the diode D$_4$, thus the second thyrister SCR$_2$ becomes ON. Therefore, as the first electro-magnetic clutch coil CL$_1$ becomes conductive connecting the electro-magnetic clutch plates 24 and 27, the release control rotating member 26 is rotated in a clockwise direction. Thereby the lock mechanism 2 functions, that is, the riser part 29a of the release cam 29 pushes the release lever 35 through the roller 38, therefore the release member 5 is pushed to start the shutter release and at the same time the end part 35a of the release lever 35 engages with the stepped part 36a of the engaging lever which is biased in a clockwise direction by the spring 39, and is locked. By this locking the movable contact of the switch S$_3$ is changed over from the fixed contact a to the fixed contact b side. This state is shown in FIG. 7a. And as the rotating part 26 continues rotation the pin 29a rotates the lever 32, which is biassed by the spring 31, in a counterclockwise direction, releasing the engagement between the stepped part 32a and the end part 34a of the T-shape lever 34. By this the T-shaper lever 34 is rotated by the spring 33 in a counterclockwise direction as far as the position of the stopper 34a. Immediately after this the pin 29a pushes the movable contact of the switch S$_3$' placing the switch S$_3$' momentarily in OFF state cutting off the conductance of the first electro-magnetic clutch coil CL$_1$. This state is shown in FIG. 7b. Since the second thyrister SCR$_2$ becomes OFF by the momentary off of the switch S$_3$', the plus pulse is given to the gate again, and above mentioned first electro-magnetic clutch coil CL$_1$ will not be in conductive state until the second thyrister becomes ON. By this engagement between the electro-magnetic clutch plates 24 and 27 is released, but the rotating member 26 continues, as shown in FIG. 7d, rotating by inertia until the engaging part 28a of the stop cam 28 is engaged with the end part 34b of the T-shape lever 34. Also, as the movable contact of the above mentioned switch S$_3$ is changed over to the fixed contact b side, the photographing time control circuit 4 functions, and after a lapse of time T$_1$ (photographing time) which is determined by the second variable resistor RV$_2$ and the capacitor C$_2$, PUJ$_2$ becomes ON, therefore plus pulse is given from the cathode of the PUJ$_2$ to the gate of the fourth thyrister SCR$_4$, thus the fourth thyrister SCR$_4$ becomes ON placing the electro-magnet P in conductive state. By this, as the electromagnet P attracts the engaging lever 36, the locking of the lock mechanism 2 that is the engagement between the stepped part 36a of the engaging lever 36 and the end part 35a of the release lever 35 is released, returning the release lever 35 and the release member 5, and completing the shutter release. This means completion of the exposure. At the same time the movable contact of the switch S$_3$ is changed over from the fixed contact b to the fixed contact a side. This state is shown in FIG. 7c. By this, the electro-magnet P cuts off its connection with the power source E, but keeps ON state for a predetermined length of time by the electric charge of the capacitor $C_{11}$. At this time while the fourth transistor $Tr_4$ is in OFF state as the base electric potential is higher than the emitter electric potential when the movable contact of the switch $S_3$ is changed over to the fixed contact $b$ side, but as the movable contact of the switch $S_3$ is changed over to the fixed contact $a$ side, the emitter electric potential becomes higher than the base electric potential by the electric charge of the capacitor $C_4$. Therefore the fourth transistor $Tr_4$ is in ON state. Because of this, the electric charge of the capacitor $C_4$ is discharged through the resistor $R_{22}$, and therefore the plus pulse is given to the first thyrister $SCR_1$ through the diode $D_1$, thus the first thyrister $SCR_1$ becomes ON, placing the second electro-magnetic clutch coil $CL_2$ in conductive state. By this, as the electromagnetic clutch plates 20 and 22 are coupled together, the rotation of the motor M is transmitted to the wind up coupler 5 rotating the same performing the shutter wind up action. And when the shutter wind up action is completed, because of the increase of the output torque of the motor M its reaction increases momentarily. Therefore, the Y-shape forked lever 12 rotates in a clockwise direction against the spring 14, placing the switch $S_4$ in OFF state momentarily and at the same time the pin 34$d$ of the T-shape lever 34 is pushed up, rotating the T-shape lever 34 to clockwise direction against the spring 34, coupling the end part 34$a$ of the T-shape lever 34 and the stepped part 32$a$ of the lever 32. By this the T-shape lever 34 has the engagement between its end part 34$b$ and the engaging part 28$a$ of the stop cam 28 is released, placing the rotating member 26 in a rotatable state. At the same time, as the switch $S_4$ momentarily becomes off, the second electromagnetic clutch coil $CL_2$ becomes OFF. By the momentary off of the switch $S_4$ the first thyrister $SCR_1$ becomes OFF, therefore the plus pulse is given to the gate again, thus the second electromagnetic clutch coil $CL_2$ will not be in conductive state until the first thyrister $SCR_1$ becomes ON. Because of this, the coupling of the electro-magnetic clutch plates 20 and 22 is released, therefore the rotation of the motor M will not be transmitted to the wind up coupler 5, thus the shutter wind up action will be stopped. Also, while the first rransistor $Tr_1$ is placed in OFF state since the base electric potential becomes higher than the emitter potential when the switch $S_4$ is in ON state, the emitter electric potential becomes higher than the base electric potential by the electric charge of the capacitor $C_3$ when the switch $S_4$ momentarily becomes OFF, thus the first transistor $Tr_1$ becomes ON. By this the electric charge of the capacitor $C_3$ is discharged through the resistor $R_3$, and thus the plus pulse is given to the gate of the third thyrister $SCR_3$, placing the third thyrister $SCR_3$ in ON state. Therefore, the photographing interval time control circuit 2 functions and after a lapse of $T_1$ seconds (photographing interval) which is determined by the first variable resistor $RV_1$ and the capacitor $C_1$, $PUJ_2$ becomes ON, thus the plus pulse from the cathode of said $PUJ_1$ is given to the base of the second transistor $Tr_2$, placing the second transistor $Tr_2$ in ON state. By this the third transistor $Tr_3$ becomes ON, and the plus pulse is given to the gate of the second thyrister $SCR_2$ through the diode $D_5$, placing the second thyrister $SCR_2$ in ON state. Thus returning to the first state, and when the release button is kept being pushed, the first electromagnetic clutch coil $CL_1$, the electro-magnet P, and the second electro-magnetic clutch coil $CL_2$ work in turn with the ratio of the photographing time $T_1$ and the photographing interval time $T_2$, thus continued photographing is done.

And as the release button is released the switches $S_1$ and $S_2$ become OFF, and at the time when the shutter wind up is completed the switch $S_4$ becomes OFF, then the conductance to the relay L is cut off and the relay contact $l_1$ becomes OFF, thus the power source self retention is not done, and the motor M is stopped and all function is stopped.

Next, explanations shall be made on the case when one frame photographing is done. In this one frame photographing while the movable contact of the switch $S_5$ is changed over to the fixed contact $b$, the setting of other switches is same as that in the continuous photographing, therefore explanation of such portion as having same function as in the continuous photographing shall be omitted. After the shutter release wind up, the plus pulse from the first transistor $Tr_1$ will not reach the third thyrister $SCR_3$ as the switch $S_5$ is changed over to the fixed contact $b$ side. Because of this for making photographing again the release button is once released placing the switches $S_1$, $S_2$ in OFF state, then the release button is pushed again placing the switches $S_1$, $S_2$ in ON state to conduct photographing.

And the photographing time $T_1$ second may be so determined as corresponding to the brightness using a photo-conductive element such as CdS, etc., instead of the second variable resistor $RV_2$.

Also about the photographing time $T_1$, the movable contact of the switch $S_6$ is changed over to the fixed contact $b$ side, and instead of the signal by the second variable resistor $RV_2$, the capacitor $C_2$, such external signals as light, sound, electric wave, etc. being supplied from the terminal Sig. 1 may be used to control the fourth thyrister $SCR_4$. For example when a Braun tube CRT is photographed, the fourth thyrister $SCR_4$ may be placed in ON state by a sweeping completion signal, to complete exposure.

Similarly, about the photographing interval time $T_2$ second, the movable contact of the switch $S_7$ is changed over to the fixed contact $b$ side, and instead of the signal by the first variable resistor, the capacitor $C_1$ such external signals as light, sound, electric wave, etc. supplied by the terminal Sig. 2 may be used to control the second thyrister $SCR_2$ to work the first electromagnetic clutch coil $CL_1$.

The electric control device in which both the photographing time control device and the photographing interval control device mentioned above are composed by timer circuits may be so made as a separate unit from a camera main body.

Figure 8:
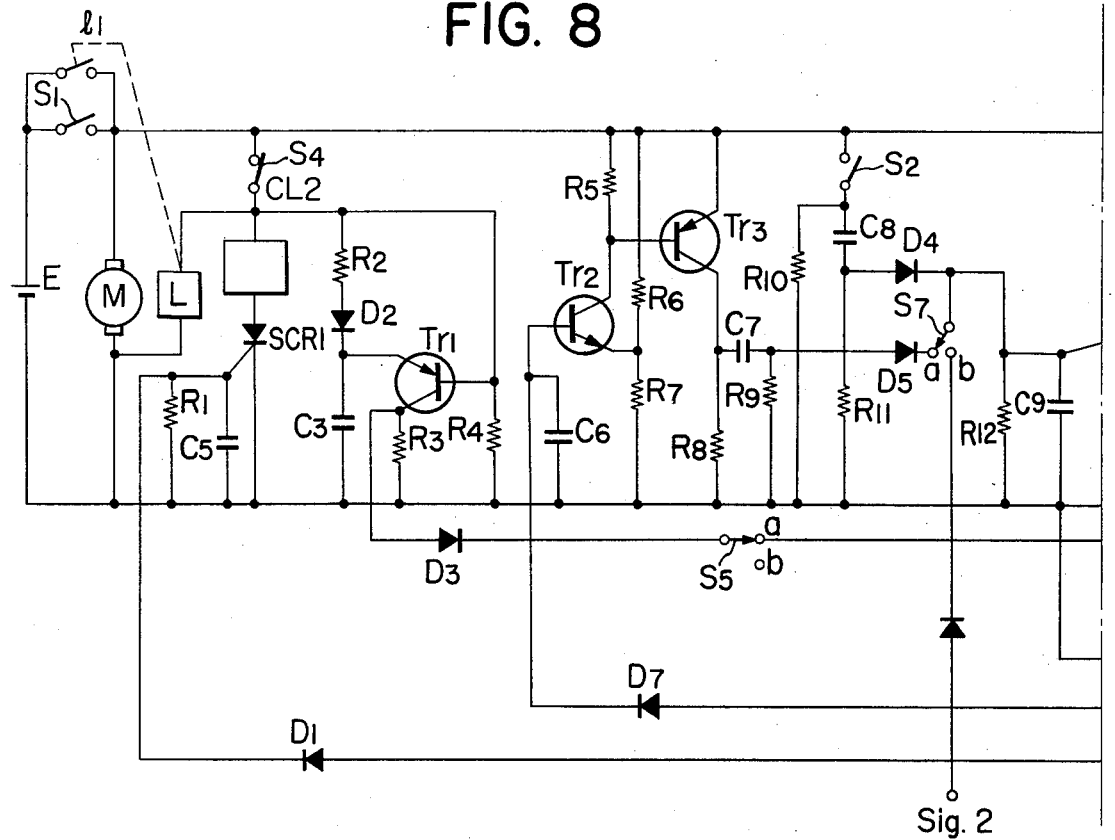
FIG. 8 is a circuit diagram to show a first modification example of the photographing time control circuit shown in FIG. 2.
Figure 8:
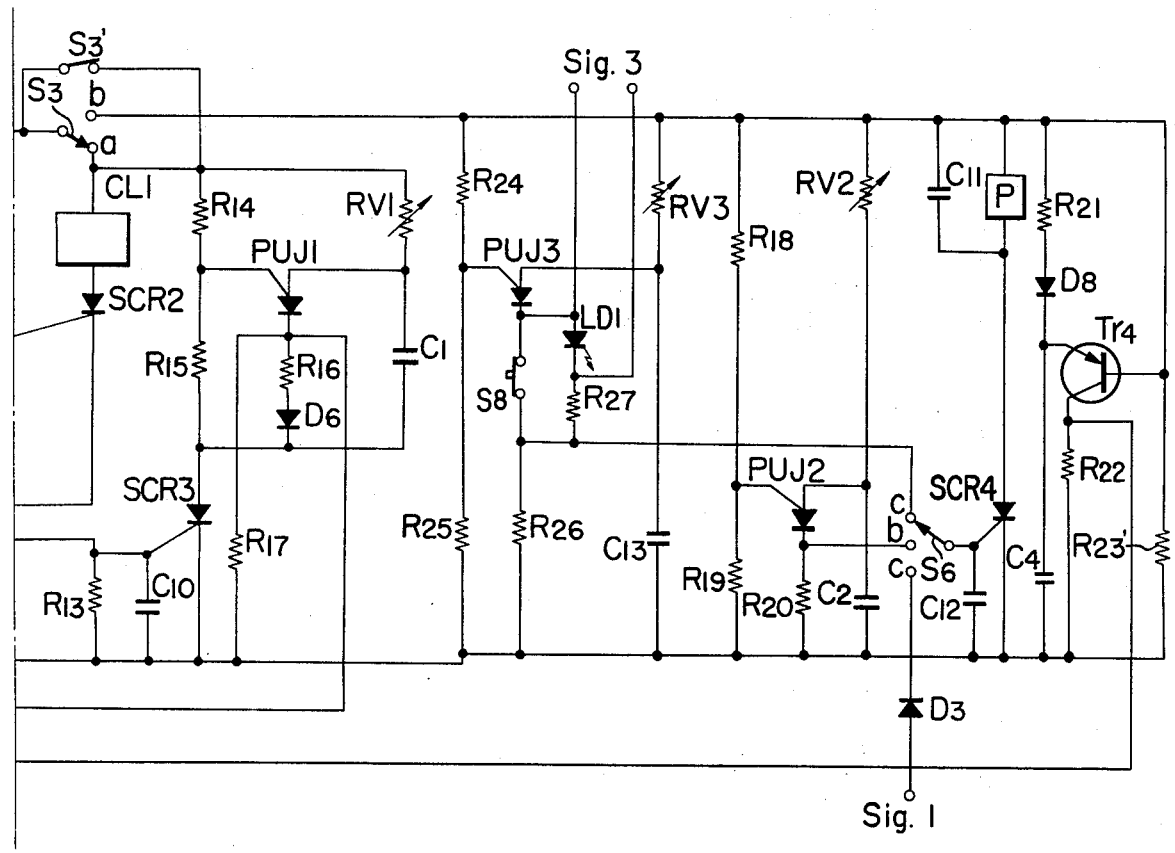

As a modified example of the photographing time control circuit 4 of the present invention, the photographing time $T_1$ second may be so determined as corresponding to the film exposure time as shown in FIG. 8. Explanations on the parts corresponding to those shown in FIG. 6 are omitted. That is, the fixed contact $b$ of the switch $S_3$ is connected to the negative electric potential side of the power source E through the third variable resistor $RV_3$ and the capacitor $C_{13}$ intervened in series, and the fixed contact $b$ of the switch $S_3$ is connected to the negative potential side of the power source E through the resistor $R_{24}$ and the resistor $R_{25}$ intervened in series. The connecting point between the resistor $R_{24}$ and the resistor $R_{25}$ is connected to the gate of a third programable uni-junction (hereinafter called PUJ), and the anode of this $PUJ_3$ is connected to the connecting point between the above mentioned third variable resistor $RV_3$ and the capacitor $C_{13}$, while the cathode of said $PUJ_3$ is connected to the negative potential side of the power source E through the switch $S_8$ and the resistor $R_{26}$ which become ON by the film exposure completion signal intervened in series, and the cathode of said $PUJ_3$ is further connected to the fixed contact c of the switch $S_6$ through the luminous diode $LD_1$ and the resistor $R_{27}$ intervened in series. The fixed contact point c of switch $S_6$ is connected to the connecting point between the above mentioned switch $S_8$ and the resistor $R_{26}$. And a terminal Sig. 3 for giving an indication of the luminous diode $LD_1$ at outside is taken out of the both ends of the luminous diode $LD_1$. In such set-up, when the movable contact of the switch $S_6$ is changed over to the fixed contact c side and the movable contact of the switch $S_3$ is changed over to the fixed contact b side by the locking of the lock mechanism 2, the $PUJ_3$ becomes ON with such time T seconds as will be determined by the third variable resistor $RV_3$ and the capacitor $C_{13}$. If the exposure of film has been completed at this time, the switch $S_8$ becomes ON, therefore the plus pulse from the cathode of the $PUJ_3$ is given to the gate of the fourth thyristor $SCR_4$ through the switch $S_8$, the switch $S_6$, placing said fourth thyristor $SCR_4$ in ON state. At this time photographing is done by a drive clock. When the exposure of film has not been completed the switch $S_8$ is in OFF state, therefore the luminous diode $LD_1$ radiates light until film exposure is completed, then the switch $S_8$ becomes ON after completion of film exposure, thereby the plus pulse from the cathode of the $PUJ_3$ is given to the gate of the fourth thyristor placing said fourth thyristor in ON state. At this time photographing is made by a shutter clock. At this time by suitably selecting the values of the capacitor $C_{13}$ and the resistor $R_{27}$ the reduction of the electric charge at the capacitor $C_3$ by the luminescence of the luminous diode $LD_1$ is held to very small amount.

Figure 9:
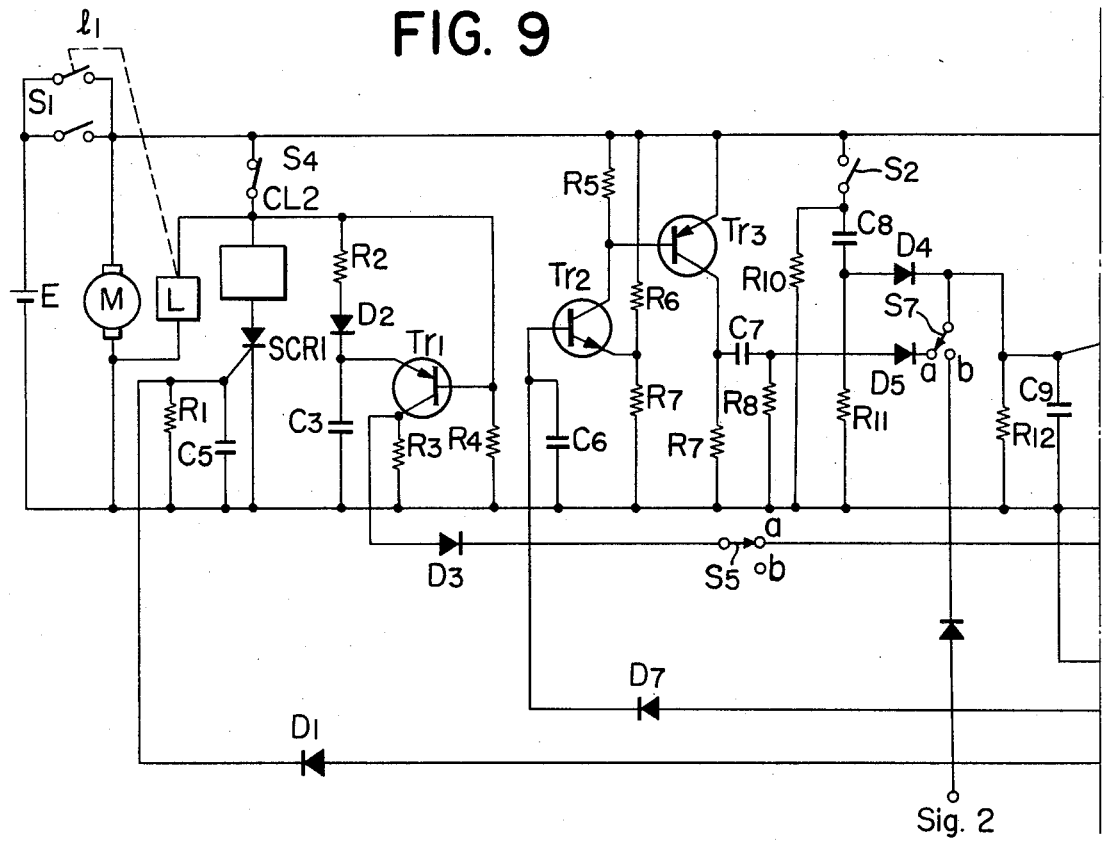
FIG. 9 is a circuit diagram to show a second modification example of the photographing time control circuit shown in FIG. 2.
Figure 9:
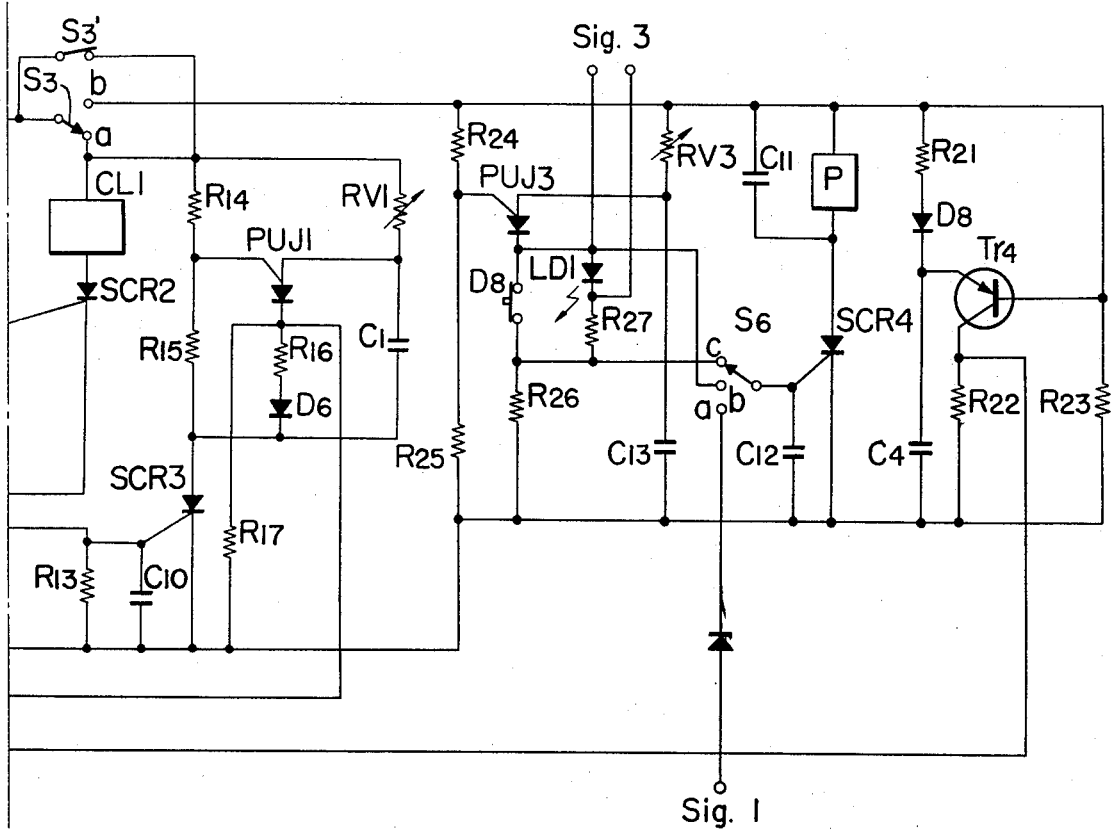
Figure 10A:
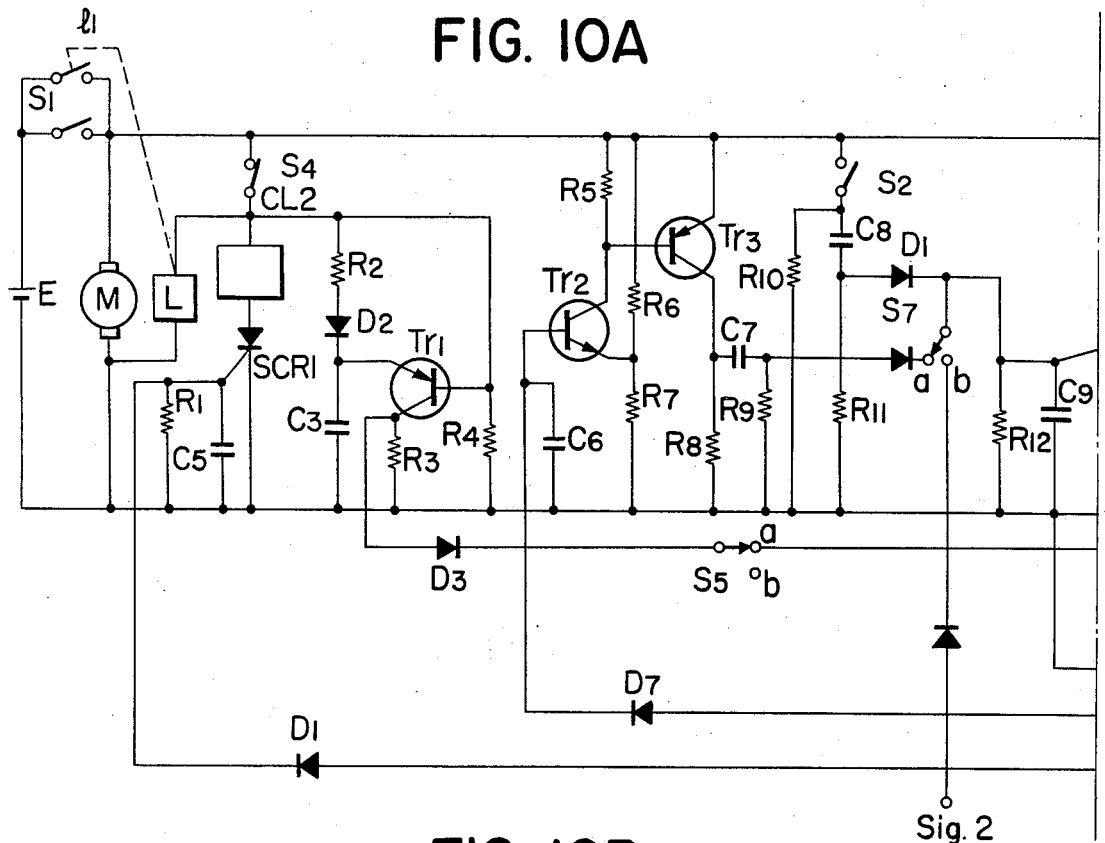
FIGS. 10A, 10B and 10C is a circuit drawing to show a third modification example of the photographing time control circuit shown in FIG. 2.
Figure 10B:
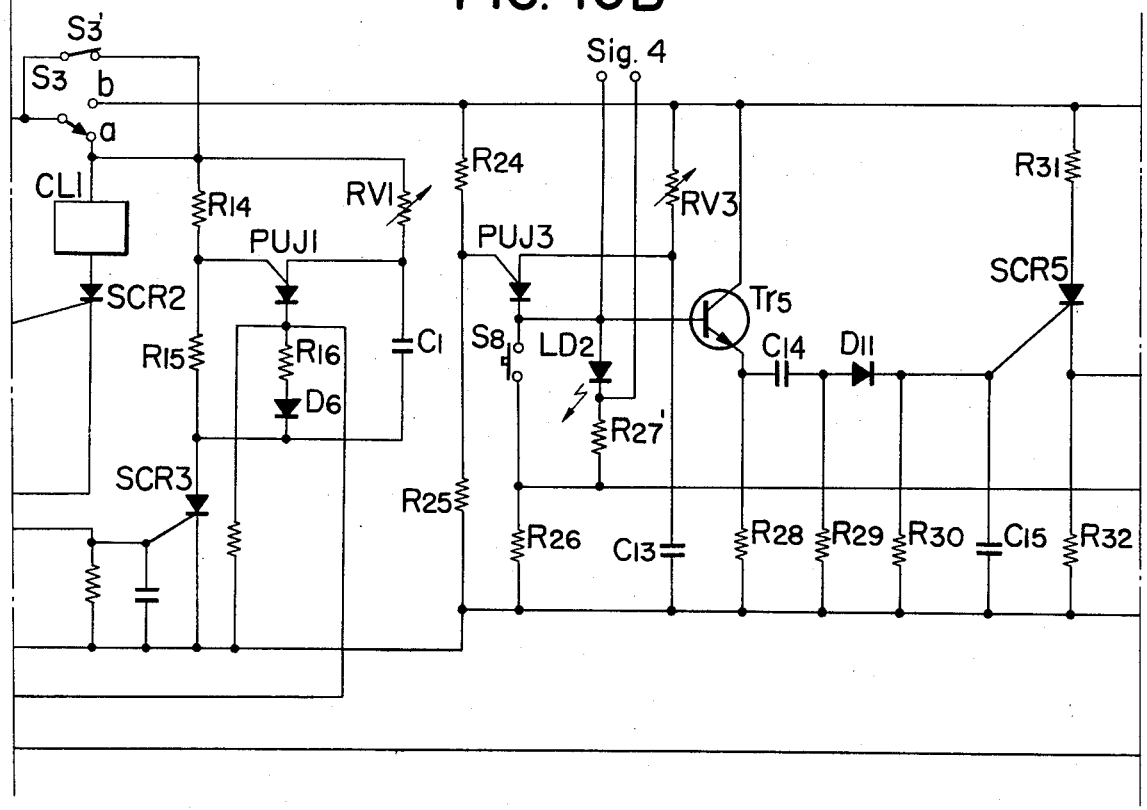
Figure 10C:
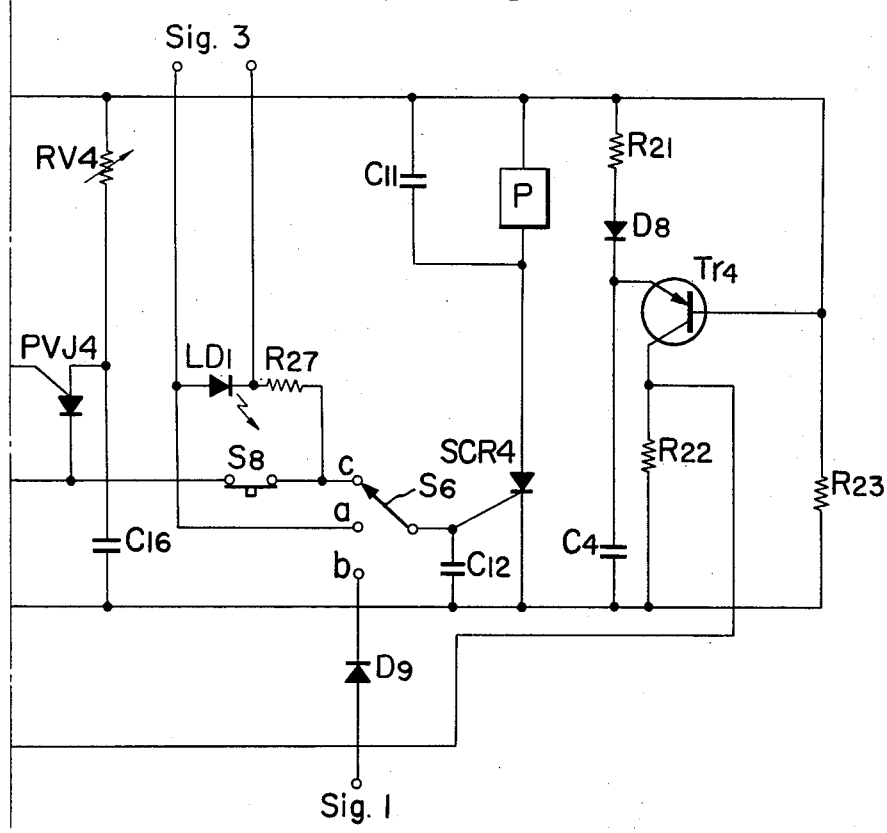

And when the circuit comprising the resistor $R_{18}$, the resistor $R_{19}$, the second variable resistor $RV_2$, the capacitor $C_2$, the $PUJ_2$ is made a long time timer circuit, while the circuit comprising the resistor $R_{24}$, the resistor $R_{25}$, the third variable resistor $RV_3$, the capacitor $C_{13}$, $PUJ_3$ is made a shutter timer circuit, said long time timer circuit and the shutter timer circuit can be served by one timer circuit as shown in FIG. 9. That is, the long time timer circuit in FIG. 8 is removed and the anode of the luminous diode $LD_1$ may be connected to the fixed contact b of the switch $S_6$. The case when the plural number for example two of the shutter timer circuit shown in FIG. 9 are used will be shown in FIG. 10, and the explanations for the same portion as in FIG. 6 shall be omitted. That is, the cathode of the $PUJ_3$ is connected to the fixed contact c of the switch $S_6$ through the switch $S_8'$ which becomes ON by film exposure completion signal and the switch $S_8$ which becomes ON also by film exposure completion signal. The connecting point between the switch $S_8'$ and the switch $S_8$ is connected to the negative potential side of the power source E through the resistor 26. A series circuit composed of the luminous diode $LD_2$ and the resistor $R_{27}'$ is connected in parallel with said switch $S_8'$. A terminal Sig. 4 is taken out of the both ends of said luminous diode $LD_2$ for making the indication of the luminous diode $LD_2$ at outside. The anode of the $PUJ_3$ is connected to the gate of the fifth transistor $Tr_5$, and the collector of said fifth transistor $Tr_5$ is connected to the fixed contact b of the switch $S_3$, while its emitter is connected to the gate of the fifth thyristor $SCR_5$ through the capacitor $C_{14}$, the diode $D_{11}$ in series, further the emitter is connected to the negative potential side of the power source E through the resistor $R_{28}$. And the connecting point of the capacitor $C_{14}$ and the diode $D_{11}$ is connected to the negative potential side of the power source E through the resistor $R_{29}$. The gate of said fifth thyristor is connected to the negative potential side of the power source E through the resistor $R_{30}$ to which the capacitor $C_{15}$ is connected in parallel. And the anode of the fifth thyristor $SCR_5$ is connected to the fixed contact b of the switch $S_3$ through the resistor $R_{31}$, while the cathode of said fifth thyristor $SCR_5$ is connected to the negative potential side of the power source E through the resistor $R_{32}$. Also, the cathode of the fifth thyristor $SCR_5$ is connected to the gate of a fourth programable uni-junction (hereinafter called PUJ), and the anode of said $PUJ_4$ is connected to the fixed contact b of the switch $S_6$ through the fourth variable resistor $RV_4$, while the anode of the $PUJ_4$ is connected to the negative potential side of the power source E through the capacitor $C_{16}$, further the cathode of the $PUJ_4$ is connected to the connecting point between the above mentioned switch $S_9$ and the switch $S_8$. And a series circuit of the luminous diode $LD_1$ and the resistor $R_{27}$ is connected in parallel with the both ends of the switch $S_8$, and a terminal Sig. 3 for making an indication of the luminous diode $LD_1$ at outside is taken out of the both ends of said luminous diode $LD_1$. The anode of said luminous diode $LD_1$ is connected to the fixed contact b of the switch $S_6$ through the connecting point between the above mentioned switch $S_8'$ and the switch $S_8$. And a first shutter timer circuit is composed by the above mentioned resistor $R_{24}$, resistor $R_{25}$, the third variable resistor $RV_3$, the capacitor $C_{13}$, and $PUJ_3$, while a second shutter timer circuit is composed of the above mentioned resistor $R_{31}$, the resistor $R_{32}$, the fourth variable resistor $RV_4$, the capacitor $C_{16}$, and $PUJ_4$. Under such set-up as just mentioned, when the movable contact of the switch $S_6$ is changed over to the fixed contact c, and the movable contact of the switch $S_3$ is changed over to the fixed contact b side by locking of the lock mechanism 2, the $PUJ_3$ becomes ON after a lapse of time of T seconds which is determined by the third variable resistor $RV_3$ and the capacitor C. If film exposure has been completed at this time the switches $S_9$ and $S_8$ become ON, therefore the plus signal from the cathode of the $PUJ_3$ is given to the gate of the fourth thyristor $SCR_4$, placing said fourth thyristor $SCR_4$ in ON state, at this time a drive clock photographing by the first shutter timer circuit is done. On the other hand, if film exposure has not been completed the switch $S_9$ is OFF, therefore the luminous diode $LD_2$ radiates light making such indication that the first shutter timer is not in proper state, and at the same time the fifth transistor $Tr_5$ becomes ON. By this plus pulse is generated by the resistor R and the capacitor C and is given to the gate of the fifth thyristor $SCR_5$, thus placing said thyristor in ON state. Because of this, the $PUJ_4$ becomes ON after an lapse of time of T seconds which is determined by the fourth variable resistor $RV_4$ and the capacitor C. If film exposure has been completed by this time the switch $S_8$ becomes ON, therefore the fourth thyrister $SCR_4$ becomes ON by the plus pulse from the cathode of the $PUJ_4$. At this time a drive clock photographing by the second shutter timer control circuit will be made. Also if the film exposure has not been completed the switch $S_8$ becomes OFF, therefore the luminous diode $LD_1$ radiates light making such indication that the second shutter timer also is improper. When the film exposure is completed the switch $S_8$ becomes ON, and the plus puls from the cathode of the $PUJ_4$ is given to the gate of the fourth thyrister, placing said thyrister in ON state. At this time photographing is done with shutter clock and the above mentioned indication that the second shutter timer is also improper means that photographing will be done with shutter clock. By connecting these shutter timer circuits any number of shutter timers may be set.

As has been described in detail according to the present invention the rotation of a motor is transmitted by an electromagnetic clutch. And thus the shutter release wind up can be repeated while the rotation of the motor is continued, easily allowing high speed continuous photographing. Also since outside trigger terminals are provided at the photographing time control circuit and at the photographing interval time control circuit, the photographing cycle can be easily controlled by such external signal as light, sound, electric wave, etc. Also as the time set at the photographing time control circuit can be made variable, a wide range of shutter speed can be used depending on exposure conditions, further by changing over the switch $S_5$ four different modes of use that is hand holding and remote for each of one frame photographing and continuous photographing can be easily selected. Furthermore, a plural number of timer circuits are provided at the photographing time control circuit, and when film exposure time comes in accord with each of the time set at each timer circuit, it is made as the photographing time, and even when the film exposure time exceeds each of the set time, automatically the completion of film exposure is waited and is made as the photographing time, thus both drive clock system and shutter clock system can be provided. The electric control device for a camera in the present invention has such effect that the state of photographing action can be easily seen by eyes as a means provided to indicate whether the drive clock or the shutter clock is in use.

What is claimed is:

1. An electric control device for a camera which comprises a first electro-magnetic clutch means for shutter release being able to be coupled to a motor being rotated, a second electro-magnetic clutch means for shutter wind-up also being able to be coupled to a motor being rotated, a first clutch control means placing said first electro-magnetic clutch means in a coupled state in association with pressing down of a release button, a lock means operable to lock a release member when said first electromagnetic clutch means is in coupled state to initiate shutter release, a first switch means responsive to the operation of the lock means to place said first electro-magnetic clutch means in a non-coupled state, a photographing time control circuit rendered effective by the operation of said lock means, a lock release means operative to release the above mentioned lock means after a lapse of time set by said photographing time control circuit, a second electromagnetic clutch control means responsive to the operation of the lock release means to place the above mentioned second electro-magnetic clutch means in a coupled state, and a second switch means operative upon the completion of the above mentioned shutter wind-up to place the above mentioned second electromagnetic clutch means in a non-coupled state, whereby separate shutter release and wind-up operations may be accomplished while the motor is being continuously rotated.

2. An electric control device for a camera according to claim 1, in which the device further comprises, a triggerable photographing interval time control circuit operable upon triggering for establishing a predetermined time delay, means responsive to the operation of the second switch means for triggering the photographing interval time control circuit, and means rendered effective at the conclusion of the time delay established by the photographing interval time control circuit for again placing the first electro-magnetic clutch means in the coupled state.

3. An electric control device for a camera according to claim 1, in which the device further comprises means responsive to the operation of the second switch means for terminating the rotation of the motor.

4. An electric control device for a camera according to claim 1, in which the photographing time control circuit comprises an adjustable R-C series circuit operable when selected for manually setting the above mentioned time lapse manually, an external input operable when selected for setting the above mentioned time lapse in accordance with an external parameter, and third switch means for selecting between the series circuit and the external input.

5. An electric control device for a camera according to claim 2, in which the photographing interval time control circuit comprises an adjustable R-C series circuit operable when selected for setting the above mentioned time delay manually, an external input operable when selected for setting the above mentioned time delay in accordance with an external parameter, and third switching means for selecting between the series circuit and the external input.

6. An electric control device for a camera according to claim 2 wherein the photographing time control circuit and the photographing interval time control circuit comprise timer circuits made as separate units from a main body of the camera.

7. An electrical control device for a camera according to claim 1, in which the photographing time control circuit comprises a plural number of timer circuits to set times, and in which the photographing time control circuit includes facilities for setting the photographing time equal to the time required for exposure of film when such exposure time exceeds any one of said set times.

8. An electric control device for a camera according to claim 7 in which the photographing time control circuit further comprises a means to indicate that the photographing time is over the set time.

9. An electric control device for a camera according to claim 7 in which the photographing time control circuit further comprises a means to indicate that the photographing time is within the set time.

* * * * *